United States Patent
Chenet et al.

(10) Patent No.: US 6,787,602 B2
(45) Date of Patent: Sep. 7, 2004

(54) METHOD AND INSTALLATION FOR MAKING AN OPTICAL FIBER

(75) Inventors: Pierre Chenet, Antony (FR); Marie-Noëlle Erout, Verrieres le Buisson (FR)

(73) Assignee: Optectron Industries, Les Ulis Cedex (FR)

( * ) Notice: Subject to any disclaimer, the term of this patent is extended or adjusted under 35 U.S.C. 154(b) by 175 days.

(21) Appl. No.: 10/030,959

(22) PCT Filed: Jan. 18, 2001

(86) PCT No.: PCT/FR00/01985

§ 371 (c)(1),
(2), (4) Date: Jun. 10, 2002

(87) PCT Pub. No.: WO01/04394

PCT Pub. Date: Jan. 18, 2001

(65) Prior Publication Data

US 2002/0183462 A1 Dec. 5, 2002

(30) Foreign Application Priority Data

Jul. 9, 1999 (FR) ............................................. 99 09124

(51) Int. Cl.⁷ ............................................... C08L 31/00
(52) U.S. Cl. .................... 524/832; 526/329.7; 428/373; 264/1.24; 264/1.28; 264/1.29
(58) Field of Search ...................... 526/329.7; 524/832; 428/373; 264/1.24, 1.28, 1.29

(56) References Cited

U.S. PATENT DOCUMENTS 4,381,269 A * 4/1983 Kaino et al. ................ 264/1.24

FOREIGN PATENT DOCUMENTS

| EP | 0190656 | 8/1986 | ........... B29D/11/00 |
|----|---------|--------|-----------------------|
| EP | 0584632 | 2/1994 | ........... C08F/20/12 |
| FR | 2252586 | 6/1975 | ............ G02B/5/14 |
| FR | 2405806 | 5/1979 | ........... B29D/11/00 |
| FR | 2493997 | 5/1982 | ............ G02B/5/14 |
| JP | 55 103 504 | 8/1980 | ............ G02B/5/14 |
| JP | 58 88 701 | 5/1983 | ............ G02B/5/14 |
| JP | 58 88 702 | 5/1983 | ............ G02B/5/14 |

* cited by examiner

*Primary Examiner*—William Cheung
(74) *Attorney, Agent, or Firm*—McCarter & English, LLP

(57) ABSTRACT

A subject matter of the invention is a batchwise process for the manufacture of an optical fiber made of polymers, the core of the fiber being based on methyl methacrylate. This process is carried out in an in-line plant leaktight with respect to the outside ranging from a device for the purification of the starting materials to a spinning device, involving the intermediacy of an intermediate storage region. The core of the fiber is prepared from beads of a polymer based on purified methyl methacrylate obtained by aqueous suspension polymerization.

Another subject matter of the invention is an in-line plant for the implementation of this process.

17 Claims, 1 Drawing Sheet

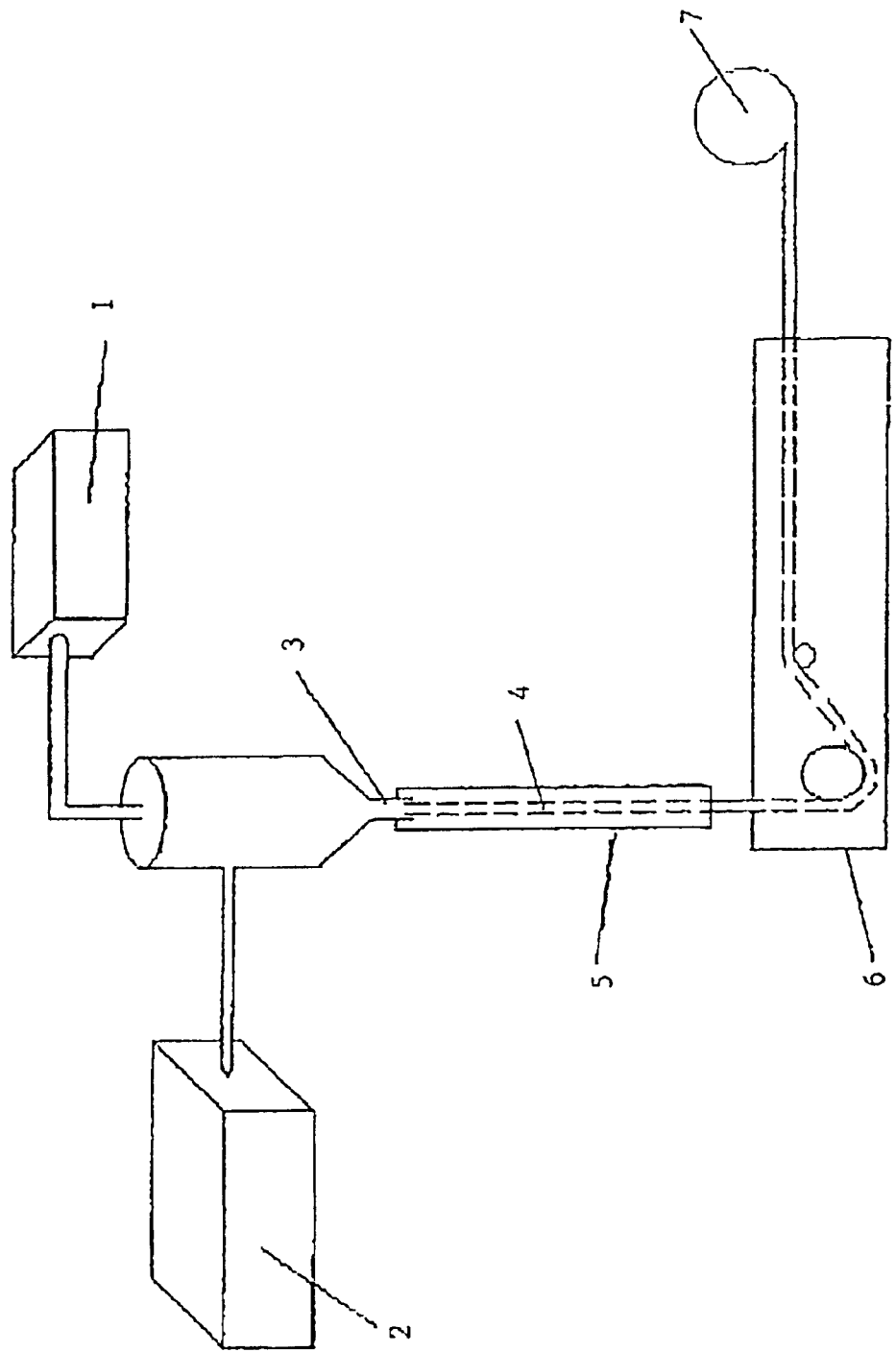
SINGLE FIGURE

METHOD AND INSTALLATION FOR MAKING AN OPTICAL FIBER

The present invention relates to a process for the manufacture of an optical fiber made of polymers with low transmission losses, this fiber comprising a core and a sheath, the core being formed from a first polymer based on methyl methacrylate and optionally on another (meth) acrylic ester and the sheath being formed from a second polymer having a lower refractive index than that of the core.

The present invention also relates to a plant for the implementation of this process.

One of the problems encountered by manufacturers of optical fibers made of polymers is that of reducing to a minimum the amount of defects, impurities and dusts in the core polymer, as they absorb or scatter light and thus accentuate the weakening of the light transmitted in the optical fiber.

A known process for the manufacture of an optical fiber made of polymers consists first in preparing a solid cylindrical rod formed from a first polymer based on methyl methacrylate and then secondly in melt fiberizing this solid cylindrical rod by extrusion. The second polymer, which acts to form the sheath of the optical fiber, can be applied by coextrusion or coating from a solution.

Such a process is disclosed in particular in French patent No. 2 405 806. One of the difficulties of such a process is the production of a solid cylinder of the polymer of the core, which is prepared by radical bulk polymerization of purified methyl methacrylate. Complete control of the polymerization and in particular of the exchanges of heat is essential in order to prevent any formation of bubbles.

Another known process for the manufacture of an optical fiber made of polymers consists of a continuous process according to which the monomers for forming the core of the fiber, essentially methyl methacrylate, the polymerization initiator and the chain-transfer agent are distilled and purified under sealed or leaktight conditions. A polymerization vessel is subsequently filled with the materials thus distilled, and the radical bulk polymerization is carried out by heating under reduced pressure.

The resulting polymer, the temperature of which is not lowered to the glass transition temperature or less, is continuously conveyed to a spinning device in order to subsequently obtain a fiber.

Such a process is disclosed in particular in French patent No. 2 493 997.

As in the preceding process, the radical bulk polymerization has to be fully and precisely controlled. This is because the control temperature is in this instance particularly important as the radical bulk polymerization of methyl methacrylate is highly exothermic and can dangerously accelerate. At the industrial level, the exothermicity of the polymerization reaction causes safety problems which are complex to manage.

However, despite the abovementioned disadvantages of the radical bulk polymerization of methyl methacrylate, this type of polymerization is currently recommended in numerous publications and is preferred to the aqueous suspension polymerization of methyl methacrylate.

Thus, according to French patent No. 2 493 997, the preparation by suspension polymerization of the core of the optical fiber made of poly(methyl methacrylate) requires a large amount of water, the resulting polymer then being easily contaminated by optical foreign materials present in this water. Furthermore, still according to this French patent, another disadvantage of this type of polymerization results from the possibility of the contamination of the poly(methyl methacrylate) by optical foreign materials during the stage of dehydration of the polymer. Moreover, it is also specified, in this French patent, that a stage of pelletizing or of preshaping of the resulting polymer is required for melt shaping or spinning the polymer. In point of fact, there is then reason to fear that the polymer will be contaminated by optical foreign materials during the stage of pelletizing for the polymer or during a stage of feeding such a polymer in the form of pellets to a device for the manufacture of fibers, or that the polymer will be oxidized by the air, as the device for the preparation of the polymer is in the majority of cases separated from the device for the manufacture of the fibers.

According to the Japanese patent applications published before examination under the numbers 58 88,701 and 58 88,702, a significant loss of optical transmission of 890 db/km (at a wavelength of 646 nm) and of 1060 db/km (at a wavelength of 577 nm) is observed when the poly(methyl methacrylate) is prepared by aqueous suspension polymerization.

After much research by the present inventors, it has been found, surprisingly, that it is possible to manufacture an optical fiber made of polymers exhibiting low transmission losses, this fiber comprising a core and a sheath, the core being formed from a first polymer obtained by aqueous suspension polymerization of methyl methacrylate and optionally of another (meth)acrylic ester and the sheath being formed from a second polymer having a lower refractive index than that of the core.

More specifically, a subject matter of the present invention is a batchwise process for the manufacture of an optical fiber made of polymers, this fiber comprising a core and a sheath, the core being formed from a first polymer based on methyl methacrylate and optionally on a (meth)acrylic ester other than methyl methacrylate and the sheath being formed from a second polymer having a lower refractive index than that of the core.

The process according to the invention is characterized in that it is implemented in an in-line plant ranging from a device for the purification of the starting materials to a spinning device, involving the intermediacy of the various devices of the in-line plant and the various transfer means connecting the various devices of the in-line plant, this plant being leaktight to the external air and to dust and sheltered from light, in particular ultraviolet radiation.

In addition, the process according to the invention comprises the following stages:

(1) beads of the first polymer are prepared by suspension polymerization of purified methyl methacrylate and optionally of at least one purified (meth)acrylic ester other than methyl methacrylate in demineralized, filtered and deoxygenated water, the polymerization being carried out in the presence of at least one radical polymerization initiating agent, of at least one chain-transfer agent and of at least one suspending agent and in the virtually complete absence of polymerization inhibitor and of impurities, such as:
  (a) biacetyl, in an amount reduced to at most 1 ppm with respect to the total amount of monomers introduced into the polymerization reactor;
  (b) transition metal ions capable of giving strong light absorption in the visible region;
  (c) dust and particles, the various abovementioned starting materials used in the suspension polymerization having been filtered before polymerization with a filtration threshold of 0.1 micron;

the polymerization also being carried out with stirring, under an atmosphere of an inert and dedusted gas;

(2) on conclusion of stage (1), the beads are separated and washed using demineralized and dedusted water and are dried under an atmosphere of a dedusted and preferably inert gas, and the dried beads are stored under this atmosphere in at least one intermediate tank;

(3) at least a portion of the beads obtained on conclusion of stage (2) is transferred, under an atmosphere of a dedusted and preferably inert gas, from the intermediate tank or tanks to a coextrusion device and the core of the fiber, starting from said beads, and the sheath of the fiber, starting from a polymer having a lower refractive index than that of the core, are coextruded;

(4) the fiber obtained at the outlet of the coextrusion device is cooled in a gradual and controlled fashion, so as to avoid quenching the first polymer constituting the core of the fiber, and the fiber is drawn, in order to obtain a fiber with a mean total diameter which can vary from 250 to 2 000 microns.

A first important characteristic of the process according to the invention is its batchwise nature by virtue of the presence of at least one intermediate tank provided for the beads of the first polymer based on methyl methacrylate and optionally on a (meth)acrylic ester other than methyl methacrylate.

This or these intermediate tanks, which are provided upstream of the coextrusion device, provide for the storage of the dried beads of the first polymer and constitute one of the feeds of the coextrusion device.

The presence of the intermediate tank or tanks makes it possible to limit the dependence of the coextrusion stage on the stages of preparation of the dried beads of the first polymer and consequently to simplify the process according to the invention.

A second important characteristic of the process according to the invention is the fact that it is implemented in an in-line plant ranging from a device for the purification of the starting materials to a spinning device, involving the intermediacy of all the various devices of this plant and all the various transfer means connecting these various devices, and the fact that this in-line plant in its entirety is leaktight to the external air and to dust and is sheltered from light, in particular ultraviolet radiation. Consequently, the intermediate tank (or tanks) mentioned above, which belongs to the in-line plant in accordance with the present invention, is also leaktight to the external air and to dust and is sheltered from light, so that the storage of the dried beads of the first polymer is carried out under conditions which are leaktight with respect to the external environment.

By virtue of the plant according to the invention, it is possible to prevent contamination of the first polymer by dust and impurities originating from the environment external to the plant.

In addition, in order to manufacture an optical fiber with low transmission losses, the methyl methacrylate and the optional other (meth)acrylic ester used to prepare the first polymer are purified and distilled in order to virtually completely remove the polymerization inhibitor and the impurities, such as those mentioned in stage (1) of the process according to the invention.

In particular, transition metal ions, especially those of cobalt, chromium, copper, nickel, iron and manganese, give strong absorption in visible light. For this reason, it is preferable to reduce the amount of each of these ions to at most:

1 ppb for cobalt,
50 ppb for iron,
50 ppb for manganese,
5 ppb for chromium,
10 ppb for copper,
10 ppb for nickel, the abovementioned amounts, expressed in ppb (or parts per billion), being with respect to the total amount of the monomers introduced into the polymerization reactor.

Advantageously, the methyl methacrylate and the other methacrylic ester or esters used to prepare the beads of the first polymer by aqueous suspension polymerization are purified by subjecting them separately to:

an operation of filtration through a bed of basic and activated alumina, preferably under an atmosphere of an inert and dedusted gas, in order to at least partially remove the compounds possessing labile hydrogen, the highly polar compounds, such as biacetyl, and the polymerization inhibitor;

followed by at least two successive operations of distillation under partial vacuum and under an atmosphere of an inert and dedusted gas, so that, on conclusion of these distillation operations, virtually all the polymerization inhibitor, the biacetyl and the transition metal ions have been removed; the inert gas used during the distillations is generally nitrogen and the partial pressure is generally between 5 000 and 50 000 pascals, preferably of the order of 10 000 pascals;

and, finally, an operation of filtration under an atmosphere of an inert and dedusted gas, making it possible to remove virtually all the particles or dust with a mean diameter of greater than or equal to 0.1 $\mu$m.

Subsequently, the purified methyl methacrylate and, if appropriate, the purified other (meth)acrylic ester or esters are conveyed directly to the polymerization reactor via hermetically closed means, that is to say leaktight to the external air and to dust and sheltered from light, more particularly from ultraviolet radiation, while maintaining them under an atmosphere of an inert and dedusted gas. Preferably, nitrogen is used as inert gas. In addition, the inert gas is dedusted, that is to say that it has been filtered in order to remove therefrom the dust with a mean diameter of greater than or equal to 0.1 $\mu$m. This definition of a dedusted gas is valid throughout the description of the present invention.

A third important characteristic of the process according to the invention is the fact that an aqueous suspension polymerization is used to prepare the beads of the first polymer used to prepare the core of the optical fiber. To do this, use is made of water which is simultaneously demineralized, filtered and deoxygenated, in order to achieve the degrees of purity (a), (b) and (c) mentioned above in the general definition of the process according to the invention.

Surprisingly, it has been found that it is possible to manufacture an optical fiber having excellent optical transmission characteristics if all the operating conditions set out in claim 1 and restated above are observed.

Preferably, the purification is also carried out of at least one of the agents used in the implementation of the aqueous suspension polymerization reaction, more preferably of all the agents used, as follows:

the polymerization initiating agent is purified either by distillation or by recrystallization, the operation being carried out under an atmosphere of an inert and dedusted gas, and the purified polymerization initiating agent is transferred into the polymerization reactor via means leaktight to the external air and to dust while maintaining this agent under an atmosphere of an inert and dedusted gas;

the chain-transfer agent is purified by distillation, the operation being carried out under an atmosphere of an inert and dedusted gas, and the distilled chain-transfer agent is transferred into the polymerization reactor via means leaktight to the external air and to dust while maintaining this agent under an atmosphere of an inert and dedusted gas;

the suspending agent is purified by recrystallization, the operation being carried out under an atmosphere of an inert and dedusted gas, and the recrystallized suspending agent is transferred into the polymerization reactor via means leaktight to the external air and to dust while maintaining this agent under an atmosphere of an inert and dedusted gas.

In the present invention, the first polymer used to form the core of the optical fiber is based essentially on methyl methacrylate and preferably comprises at least 70 mol % of methyl methacrylate, more preferably at least 90 mol % of methyl methacrylate, these percentages being with respect to the total number of moles of vinyl monomers used to prepare the first polymer.

Use may be made, to prepare the first polymer, as (meth) acrylic ester other than methyl methacrylate, of one or more monomers chosen from the group consisting of ethyl acrylate, ethyl methacrylate, methyl acrylate, propyl acrylate, propyl methacrylate, butyl acrylate and butyl methacrylate.

The implementation of the aqueous suspension polymerization reaction requires the use of at least one polymerization initiating agent, of at least one chain-transfer agent and of at least one suspending agent, these agents preferably being purified beforehand.

It is desirable to use, as polymerization initiating agent, an agent which promotes the production of an optical fiber having low transmission losses in the region of visible light and having decomposition temperatures of less than 110° C. In this respect, mention may be made of polymerization initiating agents of azo type, such as 2,2'-azobisisobutyronitrile, known for its high degree of purity, its relatively weak influence in the visible region and its optimum operating temperature of between 50 and 80° C.

The abovementioned polymerization initiating agents can be combined with others having decomposition temperatures of greater than 110° C. In this respect, mention may be made of compounds of alkylazo type, such as azo-tert-butane, azo-n-butane, azoisopropane and azo-n-propane.

Mention may be made, as chain-transfer agents suitable for the process according to the invention, of compounds of the family of the linear mercaptans, such as n-butyl mercaptan, n-propyl mercaptan or n-dodecyl mercaptan; compounds of the family of the secondary mercaptans, such as isopropyl mercaptan, or compounds of the family of the tertiary mercaptans, such as tertbutyl mercaptan.

Mention may be made, as suspending agents suitable for the process according to the invention, of poly(vinyl alcohol)s with a degree of hydrolysis at least equal to 75%, preferably 85–90%; cellulose ethers, such as hydroxyethylcellulose; tribasic calcium phosphate; or acrylic or methacrylic acid homopolymers or copolymers of at least 50% by weight of these acids with comonomers which can copolymerize with them, in particular methyl methacrylate, these homo- or copolymers preferably being used in the form of alkali metal salts or ammonium salts or else in their form neutralized with disodium phosphate. Use is preferably made, among the abovementioned suspending agents, of salified homo- and copolymers because of their hydrophilic nature, which facilitates their removal when the beads of the first polymer are washed.

In accordance with a preferred alternative form of the process according to the invention, the various starting materials used in the preparation of the first polymer, namely the demineralized and dedusted water, the purified monomers and the suspending, chain-transfer and polymerization initiating agents, are introduced separately into hermetically closed vessels flushed with an inert gas. These vessels are connected directly to the polymerization reactor with, as intermediate, a metering device for each vessel. In addition, the introduction of the materials into the polymerization reactor is preferably carried out according to the following stages:

first, a predetermined amount of demineralized and dedusted water originating directly from a system for the production of ultrapure water is introduced into the reactor and then a suspending agent in solution in water, filtered at a threshold of 0.1 $\mu$m into the metering chamber, advantageously via a septum, is introduced, the suspending agent advantageously being introduced by imposing a pressure in the reactor slightly below atmospheric pressure. This water is heated to the polymerization temperature and, simultaneously, an inert gas, preferably nitrogen, is bubbled therein in order to remove the oxygen dissolved in the water. This stage is generally fairly long and can last several hours;

subsequently, the entire organic phase, comprising the purified monomers, the chain-transfer agent and the polymerization initiator or initiators, are introduced into the reactor via a filter with a porosity of 0.1 $\mu$m, for example by propelling with dedusted nitrogen; the entire organic phase, including the polymerization initiator, is added, preferably all at once;

the reaction mixture is stirred under somewhat turbulent conditions.

The suspension polymerization reaction is advantageously carried out under a pressure substantially equal to atmospheric pressure or slightly greater. The temperature in the polymerization reactor can vary from 50° C. to 110° C.

The polymerization reaction is carried out so that the level of residual monomers is as low as possible, preferably less than 2 mol % of the total of the monomers used in the implementation of this polymerization.

The suspension polymerization is advantageously carried out in order to prepare a first polymer, in the form of beads, the weight molecular mass ($\overline{Mw}$) of which varies from 100 000 to 200 000 with a polydispersity (P) of the order of 2.

On conclusion of the polymerization reaction, the beads obtained of the first polymer are separated and washed using demineralized and dedusted water and the beads are dried under an atmosphere of a dedusted gas (that is to say devoid of dust or of particles with a diameter equal to or greater than 0.1 $\mu$m) and, under this atmosphere, the dried beads are stored in at least one intermediate tank.

The intermediate tank (or tanks) can also be the thermostatically-controlled chamber used to dry the beads of the first polymer.

The beads of the first polymer which are obtained on conclusion of the polymerization reaction are advantageously sorted in order to remove those with a mean diameter of less than 200 $\mu$m. More preferably, to prepare the core of the optical fiber, only the beads of the first polymer with a mean diameter varying from 500 $\mu$m to 2 mm are used.

The beads of the first polymer are advantageously subjected to an antistatic electricity treatment, before and/or during the operation for drying the beads.

As indicated above, the various devices for the separation, washing, optional sorting, drying, optional antistatic electricity treatment and storage of the beads of the first polymer, and the means for transfer between these devices, are leaktight to the external air and dust and are sheltered from light, in particular from ultraviolet radiation.

The operations for separation, washing, sorting, drying, antistatic treatment, storage and transfer of the beads of the first polymer used to prepare the core of the optical fiber are preferably carried out under an atmosphere of a gas which is dedusted and inert, for example nitrogen.

According to another preference, it is advantageous, in the various devices for the separation, washing, optional sorting, drying, optional antistatic electricity treatment and storage of the beads of the first polymer, and the means for transfer between these coextrusion devices, to operate with a slight excess pressure with respect to atmospheric pressure, in order to prevent dust from being able to reenter the plant.

The dried beads of the first polymer are subsequently transferred from the intermediate tank to a coextrusion device via leaktight means which are under an atmosphere of a dedusted gas, preferably an inert dedusted gas. The core of the fiber, starting from said beads, and the sheath of the fiber, starting from a polymer having a lower refractive index than that of the core and preferably in the form of beads, are coextruded.

In accordance with the process according to the invention, the transfer between intermediate tank and the coextrusion device takes place without contact with the outside, the transfer means being leaktight to the external air and to dust and being sheltered from light, more especially ultraviolet radiation.

The composition of the sheath used in the present invention is a polymer having a lower refractive index than that of the core. Many polymers can be used as sheath. Mention may in particular be made of polymers or copolymers of fluorinated esters of methacrylic acid, such as, for example, poly(trifluoroethyl methacrylate), poly(pentafluoropropyl methacrylate), poly(hexafluoropropyl methacrylate) or poly(heptafluorobutyl methacrylate); copolymers of vinylidene fluoride (VDF) with tetrafluoroethylene (VDF-TFE) or hexafluoropropene (VDF-HFP); or (VDF-HFP) or (VDF-TFE) copolymers with fluorinated esters of (meth)acrylic acid.

Preferably, to form the sheath, substantially amorphous polymers are chosen.
The dried beads of the first polymer and the polymer of the sheath, preferably in the form of beads, are melted and hot spun by passing through a coextrusion device comprising at least one screw extruder equipped with a degassing chamber, to form the core of the fiber, and a screw extruder used to form the sheath of the fiber, and a device for spinning a composite of the core-in-sheath type.

Preferably, the extrusion of the first polymer used to prepare the core of the optical fiber is carried out at a temperature not exceeding 280° C.

At the outlet of the coextrusion device, in the die, the temperature is generally of the order of 220–250° C.

For the overall automatic control of the coextrusion line, and in order to ensure that the final diameter of the fiber is even, the operation will preferably be carried out in the following way:
  a first automatic control, taking into account the temperatures of the various parts of the extruder, the pressures and the rotational speeds of the screws, which makes it possible to provide a constant material throughput at the outlet of the die head;
  a second automatic control which makes it possible to ensure that the final diameter of the fiber is even: automatic control of the drawing rate by continuous measurement of the diameter in a region where the fiber has reached a temperature of approximately 80° C.

It is possible, by operating in this way, to eliminate the critical region where the material is in an elastic phase, which can lead to a pumping region with high oscillations and thus very significant variations in diameters.

The optical fiber exiting from the coextrusion device is gradually cooled, avoiding a sudden fall in the temperature of the optical fiber which might damage its mechanical and optical properties by a quenching effect.

In order to gradually cool the optical fiber exiting from the spinning device, use is preferably made of one or other of the two following methods:

First method: the optical fiber is cooled using a gas stream and then using temperature regulated water, by sprinkling, spraying and/or immersion. Cooling using a gas stream is preferably carried out inside a protective column surrounding the fiber in order to prevent disturbance to the fiber which would risk modifying its geometry, in particular its diameter. More preferably, the protective column is composed of several successive units with a passage for the optical fiber, each of these units being heated at a temperature which decreases with distance from the spinning device: this makes it possible to provide gradual, slow and controlled cooling of the optical fiber until a temperature is obtained which is sufficiently low to carry out the cooling with water without the risk of quenching.

Second method: the fiber is cooled using temperature regulated water, so as not to lead to a sudden fall in the temperature of the fiber, by sprinkling, spraying and/or immersion.

At the same time as the optical fiber is gradually cooled, it is drawn while avoiding an excessively high draw ratio which might lead to an excessively high orientation of the macromolecular chains.

Preferably, the draw ratio imposed varies from 1.5 to 6, better still from 2 to 4 (the draw ratio corresponds to the ratio of the square of the diameter of the die to the square of the diameter of the optical fiber).

Another subject-matter of the present invention is an in-line plant for the implementation of the abovementioned process.

This in-line plant exhibits the following characteristics:
  it is entirely leaktight to the external air and to dust and sheltered from light, in particular ultraviolet radiation. To achieve this, the plant is in its entirety isolated from the external environment.
  it comprises:
    means for purifying the methyl methacrylate and, if appropriate, means for purifying at is least one (meth)acrylic ester other than methyl methacrylate, these purification means having to make it possible to virtually completely remove the polymerization inhibitor and impurities, such as:
      (a) biacetyl, in an amount reduced to at most 1 ppm with respect to the total amount of monomers introduced into the polymerization reactor,
      (b) transition metal ions capable of giving strong light absorption in the visible region,
      (c) dust or particles, the various abovementioned starting materials used in the suspension polymerization having, if necessary, been filtered before polymerization with a filtration threshold of 0.1 micron;

at least one reactor for the suspension polymerization of methyl methacrylate and optionally of at least one (meth)acrylic ester other than methyl methacrylate in demineralized, filtered and deoxygenated water in the presence of at least one radical polymerization initiator, of at least one chain-transfer agent and of at least one suspending agent, this reactor being equipped with means for stirring the reaction mixture and means making it possible to impose a slight partial vacuum and a slight excess pressure (relative to atmospheric pressure);

means for separating the polymer obtained in the form of beads in the aqueous suspension polymerization reactor;

optionally means for sorting the beads;

means for washing the beads with demineralized and dedusted water;

means for drying the beads in an atmosphere of a dedusted gas;

optionally means making it possible to eliminate the static electricity of the beads;

means for storing the beads;

means for transferring the beads from the polymerization reactor, involving the intermediacy of the washing, drying and storing means, to the coextrusion device;

a coextrusion device comprising:

at least one extruder: depending upon the situation, a screw extruder equipped with a degassing region, for forming the core of the optical fiber, or two successive extruders with a degassing region provided between the two extruders;

and a screw extruder for melting and kneading the second polymer used to form the sheath of the optical fiber;

and a device for spinning a composite of the core-in-sheath type;

means making it possible to cool, in a gradual and controlled fashion, the optical fiber exiting from the coextrusion plant;

means for drawing the optical fiber in order to achieve a total mean fiber diameter ranging from 250 to 2 000 microns.

Advantageously, the means for purifying the methyl methacrylate and, if appropriate, at least one (meth)acrylic ester other than methyl methacrylate successively comprise:

a filter composed of a bed of basic and activated alumina, preferably under an atmosphere of an inert and dedusted gas, in order to at least partially remove the compounds possessing labile hydrogen, the highly polar compounds, such as biacetyl, and the polymerization inhibitor;

at least one device for distillation under partial vacuum and under an atmosphere of an inert and dedusted gas, in order to remove virtually all the polymerization inhibitor, the biacetyl and the transition metal ions;

and a filter which makes it possible to remove virtually all the particles or dust with a mean diameter of greater than or equal to 0.1 $\mu$m.

An example of a coextrusion device suitable for the implementation of the process according to the invention is represented in the single FIGURE appended to the description.

Generally, this device comprises at least one extruder (1) provided with a degassing region for the beads of the first polymer used to form the core of the optical fiber and one extruder (2) for forming the sheath of the optical fiber in the device (3) for spinning a composite of core-in-sheath type.

The optical fiber (4) exiting from the spinning device (3) is cooled in a gradual and controlled fashion so as to avoid quenching the first polymer constituting the core of the fiber:

first, in a cooling region (5) having the form of a vertical passage, with air or an inert gas;

secondly, in a region for cooling (6) using temperature regulated water, by sprinkling and/or spraying and/or immersion.

At the same time as the cooling in the regions (5) and (6), the optical fiber is subjected to drawing under the abovementioned conditions.

The optical fiber is finally wound off and stored on the roller (7).

The scope of the present invention should not be restricted to the abovementioned alternative embodiments and encompasses any plant which makes possible the implementation of the process according to the invention.

What is claimed is:

1. batchwise process for the manufacture of an optical fiber made of polymers, this fiber comprising a core and a sheath, the core being formed from a first polymer based on methyl methacrylate and optionally on a (meth)acrylic ester other than methyl methacrylate and the sheath being formed from a second polymer having a lower refractive index than that of the core, this process being characterized in that the process is carried out in an in-line plant ranging from a device for the purification of the starting materials to a spinning device, involving the intermediacy of the various devices of the in-line plant and the various transfer means connecting the various devices of the in-line plant, this plant being leaktight to the external air and to dust and sheltered from light, in particular ultraviolet radiation, and in that the process comprises the following stages:

(1) beads of the first polymer are prepared by suspension polymerization of Purified methyl methacrylate and optionally of at least one purified (meth)acrylic ester other than methyl methacrylate in demineralized, filtered and deoxygenated water, the polymerization being carried out in the presence of at least one radical polymerization initiating agent, of at least one chain-transfer agent and of at least one suspending agent and in the virtually complete absence of polymerization inhibitor and of impurities, such as:

(a) biacetyl, in an amount reduced to at most 1 ppm with respect to the total amount of monomers, (b) transition metal ions capable of giving strong light absorption in the visible region, (c) dust and particles, the various abovementioned starting materials used in the suspension polymerization having been filtered before polymerization with a filtration threshold of 0.1 micron;

the polymerization also being carried out with stirring, under an atmosphere of an inert gas;

(2) on conclusion of stage (1), the beads are separated and washed using demineralized and dedusted water and are dried under an atmosphere of a dedusted and preferably inert gas, and the dried beads are stored under this atmosphere in at least one intermediate tank;

(3) at least a portion of the beads obtained on conclusion of stage (2) is transferred, still under an atmosphere of an inert and dedusted gas, from the intermediate tank or tanks to a coextrusion device and the core of the fiber, starting from said beads, and the sheath of the fiber, starting from a polymer having a lower refractive index than that of the core, are coextruded;

(4) the fiber obtained at the outlet of the coextrusion device is gradually cooled, so as to avoid quenching the first polymer intended to constitute the core of the fiber, and the fiber is drawn, in order to obtain a fiber with a mean total diameter which can vary from 250 to 2 000 microns.

2. The process as claimed in claim 1, characterized in that the first polymer used to form the core of the optical fiber is obtained by aqueous suspension polymerization of at least 70 mol % of methyl methacrylate, this percentage being with respect. to the total number of moles of vinyl monomers.

3. The process as claimed in claim 2, characterized in that the first polymer used to form the core of the optical fiber is obtained by aqueous suspension polymerization of at least 90 mol% of methyl methacrylate, this percentage being with respect to the total number of moles of vinyl monomers.

4. The process us claimed in claim 1, characterized in that the (meth)acrylic ester other than methyl methacrylate used to prepare the first polymer used to form the core of the optical fiber is chosen from the group consisting of ethyl acrylate. ethyl methacrylate, methyl acrylate, propyl acrylate, propyl methacrylate butyl acrylate and butyl methacrylate.

5. The process as claimed in claim 1, characterized in that the methyl methacrylate and the methacrylic ester or esters used to prepare the beads of the first polymer by aqueous suspension polymerization are purified by subjecting them separately to:

an operation of filtration through a bed of basic and activated alumina, preferably under compounds possessing labile hydrogen, the highly polar compounds, such as biacetyl, and the polymerization inhibitor;

followed by at least two successive operations of distillation under partial vacuum and under an atmosphere of an inert and dedusted gas, so that, on conclusion of these distillation operations, virtually all the polymerization inhibitor, the biacetyl and the transition metal ions have been removed;

and, finally, an operation of filtration under an atmosphere of an inert arid dedusted gas, making it possible to remove virtually all the particles or dust with a mean diameter of greater than or equal to 0.1 $\mu$m;

and in that the purified methyl methacrylate and the purified (meth)acrylic ester or esters are subsequently conveyed directly to the polymerization reactor via hermetically closed means while maintaining them under an atmosphere of an inert and dedusted gas.

6. The process as claimed in claim 1, characterized in that the polymerization initiating agent is purified either by distillation or by recrystallization, the operation being carried out under art atmosphere of an inert and dedusted gas, and in that the purified polymerization initiating agent is transferred into the polymerization reactor via means leaktight to the external air and to dust while maintaining this agent under an atmosphere of an inert and dedusted gas.

7. The process as claimed in claim 1, characterized in that the chain-transfer agent is purified by distillation with the operation being carried out under an atmosphere of an inert and dedusted gas, and in that the distilled chain-transfer agent is transferred into the polymerization reactor via means leaktight to the external air and to dust while maintaining this agent under an atmosphere of an inert and dedusted gas.

8. The process as claimed in claim 1, characterized in that the suspending agent is purified by recrystallization, the operation being carried out under an atmosphere of an inert and dedusted gas, and in that the recrystallized suspending agent is transferred into the polymerization reactor via means leaktight to the external air and to dust while maintaining this agent under an atmosphere of an inert and dedusted gas.

9. The process as claimed in claim 1, characterized in that the suspension polymerization reaction is carried out under a pressure substantially equal to atmospheric pressure or slightly greater.

10. The process as claimed in claim 10, characterized in that, among the dried heads of the first polymer which are obtained from the conclusion of stage (2), those with a mean diameter of less than 200 microns arc removed.

11. The process as claimed in claim 10, characterized in that, to prepare the core of the optical fiber, only the dried beads of the first polymer with a mean diameter varying from 500 micron to 2 mm are retained.

12. The process as claimed in claim 1, characterized in that the suspension average molecular mass (Mw) of which varies from 100 000 to 200 000 with a polydispersity (P) of the order of 2.

13. The process as claimed in claim 1, characterized in that the level of unreacted residual monomers on conclusion of the suspension polymerization reaction is less than 2 mol % with respect to the total of monomers used in the implementation of this polymerization.

14. The process as claimed in claim 1, characterized in that the operations of separation, washing, drying, storing and transfer of the beads of the first polymer used to prepare the core of the optical fiber arc carried out under an atmosphere of an inert and dedusted gas.

15. The process as claimed in claim 1, characterized in that the beads of the first polymer used to prepare the core of the optical fiber are extruded at a maximum temperature of 280° C.

As required by 37 C.F.R. § 1.121, a copy of the amended claims marked up to show all changes relative to the previous version of these claims is attached to this Preliminary Amendment.

16. An in-line plant for the implementation of the process as claimed in claim 1, characterized in that it is entirely leaktight to the external air and to dust and sheltered from light and in that it comprises:

means for purifying the methyl methacrylate and, if appropriate, means for purifying at least one (meth) acrylic ester other than methyl methacrylate, these purification means having to make it possible to virtually completely remove the polymerization inhibitor and impurities, such as:

(a) biacetyl, in an amount reduced to at most 1 ppm with respect to the total amount of monomers introduced into the polymerization reactor, (b) transition metal ions capable of giving strong light absorption in the visible region, (c) dust or particles, the various abovementioned starting materials used in the suspension polymerization having, if necessary, been filtered before polymerization with a filtration threshold of 0.1 micron;

at least one reactor for the suspension polymerization of methyl methacrylate and optionally of at least one (moth)acrylic ester other than methyl methacrylate in demineralized, filtered and deoxygenated water in the presence of at least one radical polymerization initiator, of at least one chain-transfer agent and of at least one suspending agent, this reactor being equipped with means for stirring the reaction mixture and means making it possible to impose a sight partial vacuum and a slight excess pressure (relative to atmospheric pressure);

means for separating the polymer obtained in the form of beads in the aqueous suspension polymerization reactor;

means for washing the beads with demineralized and dedusted water;

optionally means for sorting the beads;

means for drying the beads;

optionally means for carrying out an antistatic electricity treatment of the beads;

means for storing the beads;

means for transferring the beads from the polymerization reactor, involving the intermediacy of the drying means, to the coextrusion plant;

a coextrusion plant comprising at least two extruders:
one or two screw extruders with a degassing region for the formation of the core of the optical fiber;
and a second screw extruder for melting and kneading the second polymer used to form the sheath of the optical fiber;
and a device for spinning a composite of the core-in-sheath type;
means making it possible to cool, in a gradual and controlled fashion, the optical fiber exiting from the coextrusion plant;
means for drawing the optical fiber in order to achieve a total mean fiber diameter ranging from 250 to 2 000 microns.

17. The in-line plant as claimed in claim 16, characterized in that the means for purifying the methyl methacrylate and, if appropriate, at least one (meth) acrylic ester other than methyl methacrylate successively comprise:

a filter composed of a bed of basic and activated alumina, preferably under an atmosphere of an inert and dedusted gas, in order to at least partially remove the compounds possessing labile hydrogen, the highly polar compounds, such as biacetyl, and the polymerization inhibitor;

at least one device for distillation under partial vacuum and under an atmosphere of an inert and dedusted gas, in order to remove virtually all the polymerization inhibitor, the biacetyl and the transition metal ions;

and a filter which makes it possible to remove virtually all the particles or dust with a mean diameter of greater than or equal to 0.1 $\mu$m.

* * * * *